MICROPOROUS SUPPORT FOR REVERSE OSMOSIS MEMBRANES

Le Roy A. White, Somers, Bernard O. Baum, West Hartford, and William H. Holley, Rockville, Conn., and Harold E. Podall, Alexandria, Va., assignors to the United States of America as represented by the Secretary of the Interior
No Drawing. Filed July 7, 1971, Ser. No. 160,573
Int. Cl. C08f 29/18, 47/08
U.S. Cl. 260—2.5 M                    9 Claims

ABSTRACT OF THE DISCLOSURE

A microporous support structure for reverse osmosis membranes is prepared by compounding (1) a water-insoluble thermoplastic resin from the group consisting of polyvinyl chloride, vinyl chloride-propylene copolymer and a blend of polyvinyl chloride and vinyl chloride-propylene copolymer, (2) polyvinyl methyl ether and (3) a surfactant, forming the resulting composition into a suitable shape and extracting with water to remove a substantial portion of the polyvinyl methyl ether and surfactant, thereby forming a microporous structure.

---

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

Presently most commercial reverse osmosis desalination is carried out with asymmetric membranes as desalination barriers. The asymmetric membrane is prepared by drawing down a solution of cellulose acetate on glass or directly onto a support such as nylon cloth, paper, or a porous pipe. Treatment with water precipitates a sponge-like structure with coarser cells at the bottom supporting progressively finer cells toward the top surface; the top surface being covered by a very thin (ca. 0.2–1 micron) skin. The permselective cellulose acetate skin filters the salt out. Various mechanical configurations exist to support and utilize the asymmetric membranes, e.g., spiral-wound, plate-and-frame type press, porous tube, pipe, etc.

This technology is utilized commercially, but there are certain inherent disadvantages. One such disadvantage is the tendency of wet cellulose acetate to "creep" and compact, particularly at 1500 p.s.i. sea water desalination pressures. This creep tends to close off channels beneath the skin. This closing of channels in turn causes a gradual diminution of flow through the asymmetric membrane until uneconomical levels of flow force replacement of the membrane. Frequent membrane replacement increases the cost of desalinated water, since preparation of the asymmetric membranes (special solvents, casting techniques, temperature control, aging time, water precipitation, soaking, hot-water aging, etc.) is expensive. More costly, however, are labor for membrane replacement and equipment down time during the membrane replacement.

Another disadvantage of present asymmetric configurations is the relatively low square footage of available area for reverse osmosis per volume of desalinating module. A tiny tube or "tubulet" configuration would enable a high area/cubic foot of desalinating module, but convenient methods for preparing an asymmetric tubulet are not yet at hand and a cellulose acetate tubulet, if prepared, would not be sufficiently stiff when wet and would collapse under the high operating pressure. Solid-wall cellulose acetate and nylon tubulets are available, but, since the tubulet wall is solid and many microns thick, the water through-put per square foot is one to two orders of magnitude lower than that for asymmetric membrane. Further, the costs and technical difficulties of extruding large quantities of leak-free tubulets of very fine diameter, assembling them, and finding and plugging "leakers" before and after placing the desalinator in service are formidable.

Larger outside diameter (0.03–0.06 inch) porous tubulets coated with an asymmetric membrane or even a 1 micron skin would be easier to fabricate and utilize in equipment while affording a much higher throughout than do solid-wall tubulets. A microporous (ca. 0.5 micron pore) tubulet would possess certain advantages over a macroporous (ca. 5 micron pore) tubulet. A microporous tubulet could theoretically be coated with a skin of any of the now numerous salt-filtering plastic permselective materials. As a rule of thumb, however, the support for the filtering skin could not have pores larger in diameter than the thickness of the semipermeable skin. That is, a 0.5 micron skin requires pores no larger than 0.5 micron in diameter to avoid punch-through. Thus, if a tubulet could be fabricated from a rigid plastic with 0.5 micron average diameter pores, a great many permselective plastics known to be suitable for reverse osmosis work could be utilized much more effectively.

Prior art techniques for producing porous plastics may be divided into two categories: solvent/precipitation, and leaching. Conventional methods for producing asymmetric membranes generally employ solvent/precipitation techniques. Not all polymers are readily amenable to these techniques, however. The precipitation technique tends to give a structure similar to low-density urethane foam. Such a structure, having in effect bowed columns, is not as inherently load-supporting as a cave or channel-like pore structure in a solid mass. Further, the precipitation technique requires large amounts of solvent, e.g., 300–600 parts per hundred resin.

Channel-like pore structures have previously been imparted to plastics by careful fusion of powder, usually in air but sometimes in a mixture of solvent and nonsolvent or poor solvent. See, e.g., U.S. Pats. 2,666,036 and 2,777,-824. Similar results may be obtained where monomeric materials are mixed with nonsolvent for the polymer. In some instances the precipitating polymer causes a channel-like structure as a result of the polymerized material assuming a spherical shape with channels in between. U.S. Pat. 3,367,889 describes porous "macro-reticulated" resins formed by polymerizing monomer in the presence of 20–30 parts of water emulsified in 100 parts monomer.

The tensile strength of the final mass in the prior art fused compositions is usually marginal because the particles fuse only at small points of contact. Prolonged fusion or physical pressure will increase the tensile strength of air-fused polymers, but then pore volume suffers. Further, these methods do not lend themselves well to the extrusion of microporous tubulets.

Channel-like structures in plastics are claimed in U.S. Pats. 2,819,981 and 2,984,869, utilizing salt crystals as the channel formers. U.S. Pat. 3,379,658 claims sodium borate decahydrate is needed to insure connections between the salt crystals. Milled-in organic salts and anionic surfactants have also been utilized in various prior art processes, e.g. U.S. Pats. 3,378,507 and 3,376,238, to leave some channels after the leaching step, but size control of the channels is lacking and extraction efficiency of the surfactant is poor.

It has now been found, according to the present invention, that microporous support structures for reverse osmosis membranes may be prepared by compounding (1) a water-insoluble thermoplastic resin consisting of vinyl chloride polymers, copolymers or blends, (2) water-soluble polyvinyl methyl ether and (3) a surfactant, forming the resulting composition into the desired shape and treating it with water to extract the water-soluble polyvinyl methyl ether and surfactant. The resulting support structures are characterized by pores in the range of about 0.01 to 2 microns, porosity of about 10 to 45 percent and water flux of about 10 to 2000 gfd. at 40 p.s.i.g.

The water-insoluble thermoplastic resin should have a tensile modulus of about 150,000 to 500,000 p.s.i. It may consist of polyvinyl chloride (PVC) having a weight average molecular weight of about 40,000 to 480,000, preferably about 100,000 to 200,000. Copolymers of vinyl chloride (VC) and propylene of similar molecular weight and containing about 85 to 99.9 percent by weight of VC are also suitable. Blends of these two materials, i.e., PVC and VC-propylene copolymer, containing about 50 to 99.9 percent by weight of PVC homopolymer are also suitable. The thermoplastic resin will constitute about 50 to 90 percent by weight of the support-forming composition.

The polyvinyl methyl ether (PVME) is a thick liquid and should have a specific viscosity of about 0.2 to 1.0 (1 g. solids/100 ml. of water solution). The amount of PVME employed in compounding the support-forming composition will be about 10 to 20 percent by weight solids. The polyvinyl methyl ether is unique because it enables controlled-size pore formation and is readily extractable with water.

Surfactants suitable for practice of the invention are well known, the preferred materials being the nonionic and anionic types. Particularly preferred are the alkylphenyl polyether alcohols, sulfonates and sulfates having alkyl groups of about 6 to 12 carbons and containing about 5 to 13 ethoxy groups. Alkyldiphenyl ether disulfonates having alkyl groups of about 8 to 15 carbons have also been found to give good results, particularly where VC-propylene copolymer is employed as all, or part, of the thermoplastic resin. Optimum proportions of surfactant will vary considerably depending on the specific thermoplastic resin employed, and on the amount of this component and the PVME, as well as the molecular weight of the latter. Generally, however, the surface active agent will comprise about 5 to 30 percent by weight of the support-forming composition.

In addition to the above essential ingredients, it has also been found that the inclusion of a processing aid and a heat-stabilizing additive in the support-forming composition facilitates processing of the composition, including mixing, shaping and extraction, or improves the physical properties of the product. These ingredients are conventional in the thermoplastic resin art. The processing aid is preferably a methyl methacrylate/ethyl acrylate copolymer approximately 90/10 having a molecular weight of about 100,000 to 2,000,000. It is used in an amount of about zero to 5 percent by weight of the composition. The heat-stabilizing additive is preferably an alkyltin, e.g., tin dibutyl dilaurate or di(n-octyl) tin S,S'-bis(isooctylmercapto acetate), in an amount of about zero to 4 weight percent of the composition. Processing aids such as stearic acid, calcium stearate, magnesium stearate, paraffin wax (e.g. Ross Wax 165, Frank Ross & Co.), oxidized low MW polyethylene (e.g. Allied Chemical AC629A), polyethylene oxide (e.g. Union Carbide Carbowax 400), amide waxes (e.g. Hoechst Wax E) can be utilized, generally at the 0.5–1% level, to increase flow rate through a die orifice and yield a smoother, melt fracture-free extrudate.

Compounding of the above ingredients is accomplished by thorough mixing of the ingredients, all in powder form with the exception of the liquid PVME. The mixing is done by conventional means such as milling or by use of a mixer such as a Banbury mixer. Elevated temperature of about 154 to 177° C. is preferably employed in the mixing in order to fuse the resin and provide a continuous resin phase. Preferably, the resin, containing the surfactant and processing aid and heat-stabilizer is fused and the PVME is then added gradually while mixing to avoid breaking up the fused resin.

If the desired form of the support is a flat sheet, the mixture is then compression molded into a film at a temperature of about 160 to 180° C. and a pressure of about 250 to 2000 p.s.i.g. The optimum thickness of the film will vary considerably depending on the type of apparatus in which it is to be used, the type of reverse osmosis membrane employed, etc., but will generally be from about 0.003 to 0.016 inch in thickness. The compounded mixture may also be extruded, by conventional means, into flat sheet or into tubulets having outside diameters of about 0.03 to 0.08 inch. Temperatures used in extrusion will usually be from about 160 to 190° C., with extrusion pressures of about 100 to 4000 p.s.i. and screw speeds of about 5 to 80 r.p.m.

Following formation of the support material into the desired shape, it is leached with water to remove all, or a portion, of the PVME, thereby forming the desired porous structure of the product. Leaching is accomplished simply by immersing the formed support structure in water, preferably distilled water, for a period of about 9 to 16 hours, with overnight leaching usually being adequate. The water should be agitated, e.g., by shaking the vessel containing the support and water, for maximum efficiency of the leaching process. The total amount of material extracted will usually be from about 50 to 95 percent by weight of the support structure. After leaching, the support structure is dried for a period of about 2 to 16 hours at a temperature of about 50 to 60° C. and, preferably, in a vacuum of about 20 to 29 inches of mercury.

The invention will be more specifically illustrated by the following examples.

EXAMPLE 1

The following materials were used in preparation of a microporous support structure.

| Material: | Quantity, parts by weight (solids) |
|---|---|
| Geon 103EP (B. F. Goodrich Chemical Co.)—a suspension-polymerized, rigid PVC homopolymer having a weight average molecular weight of about 150,000 | 100. |
| Gantrez M–154 (G.A.F. Corporation)—linear PVME of viscosity, cps., 43,000, as a 50% solution in water, specific viscosity (1 g./100 ml. solvent): 0.47 | 15 (30 solution). |
| Triton X–100 (Rohm & Haas Co.)—isooctyl phenoxy polyethoxy ethanol containing 10 moles of ethylene oxide | 10. |
| Acryloid K120N (Rohm & Haas Co.)—acrylic/methacrylic polymer of molecular weight about 1,000,000 (processing aid) | 3. |
| Thermolite 831 (M&T Chemicals, Inc.) — di(n-octyl)tin S,S'-bis (isooctylmercapto acetate), heat stabilizer | 2. |

This formulation was milled at 160° C. The PVC was fused and the PVME was then added gradually to the banded resin to avoid breaking up the sheet. The compounded material, as sheeted off the mill rolls, was white, tough, and somewhat flexible. It was then compression molded into films of about 6.5 mils thickness at a temperature of 175° C. and a pressure of 1000 p.s.i., and the films were then leached in distilled water at room temperature overnight. The weight loss on leaching was found to be 10 percent.

Following leaching the films were dried for 2 hours in a 50° C. vacuum oven at 30 inches vacuum and were then tested for flow rates of water through the films and for pore size of the films. Flow rates of water were found to be 173 gfd. at 40 p.s.i.g. pressure, and the average pore size was about 0.35 micron, with 80 percent of the pores falling between 0.05 and 0.8 micron.

EXAMPLE 2

In this example the following materials were used in compounding the support structure.

| Material: | Quantity, parts by weight (solids) |
|---|---|
| Airco 480 (Airco Chemicals and Plastics)—PVC-propylene copolymer of weight average MW about 57,000 and containing about 5 percent propylene | 100. |
| Gantrez M-154 | 15 (30 solution). |
| Benax 2A1 (Dow Chemical Co.)—sodium dodecyldiphenyl ether disulfonate | 35 (77.7 solution). |
| Acryloid K120N | 3. |
| Thermolite 831 | 3. |

The resin, processing aid and stabilizer were banded on a two-roll mill at 154° C. The Benax 2A1 was then added, with the rolls being cooled slightly to reduce sticking of the sheet. The PVME was then added gradually. The product was compression molded at 160° C. and 1000 p.s.i. pressure into a 0.11 inch thick sheet, which was then leached in distilled water at room temperature overnight. Virtually all of the leachable material, i.e., about 33 percent, was removed. The product was then dried as in Example 1.

Flow rate tests in the film with distilled water showed a flux of 180 gfd. at 40 p.s.i.g. pressure.

EXAMPLE 3

In this example the following materials were used in compounding the support structure.

| Material: | Quantity, parts by weight (solids) |
|---|---|
| Geon 103EP | 50. |
| Airco 480 | 50. |
| Gantrez M-155 (G.A.F. Corp.)—linear PVME of viscosity, cps., 100,000, as 50% solution in water, specific viscosity (1 g./100 ml. water): 0.77 | 25 (50 solution). |
| Benax 2A1 (45% solution in water) | 11.25 (25 solution). |
| Acryloid K120N | 5. |
| Thermolite 831 | 3. |

The resin, processing aid and stabilizer were banded on a two-roll mill at approximately 157° C. The Benax 2A1 was then added in small increments, after which the temperature was dropped to 140° C. to keep the material from sticking to the rolls and to allow it to mill properly. The PVME was then added gradually.

A 4-gram charge of the product was compression molded into an 8 mil thick film which was then extracted in distilled water overnight, with loss of about 80 percent of the extractible material. It was then dried as in the above examples.

Flow rate tests on the film with distilled water showed a flux of 925 gfd. at 40 p.s.i.g. pressure. Average pore size was found to be 0.65 micron, with 80 volume percent of the pores having diameters between 0.22 and 2.0 microns.

We claim:

1. A method for preparing a microporous support structure for reverse osmosis membranes comprising admixing the following ingredients: (1) about 50 to 85 parts by weight of a water-insoluble thermoplastic resin from the group consisting of polyvinyl chloride, vinyl chloride-propylene copolymer and a blend of polyvinyl chloride and vinyl chloride-propylene copolymer, (2) about 10 to 20 parts by weight of polyvinyl methyl ether having a specific viscosity of about 0.2 to 1 based on a solution of 1 gram of polymer per 100 ml. of water solution and (3) about 5 to 30 parts by weight of a nonionic or anionic surfactant, at a temperature of about 154 to 177° C.; fabricating the resulting composition into a suitable shape at a temperature of about 160 to 190° C.; and extracting with water to remove a substantial portion of the polyvinyl methyl ether and surfactant, thereby forming a microporous structure.

2. The method of claim 1 in which the thermoplastic resin is polyvinyl chloride having an average molecular weight of about 40,000 to 480,000.

3. The method of claim 1 in which the thermoplastic resin is a vinyl chloride-propylene copolymer having an average molecular weight of about 40,000 to 480,000 and containing about 85 to 99.9 weight percent of vinyl chloride.

4. The method of claim 1 in which the thermoplastic resin consists of a blend of polyvinyl chloride and vinyl chloride-propylene copolymer.

5. The method of claim 1 in which the surfactant is an alkylphenyl polyether alcohol containing 5 to 13 alkoxy groups and in which the alkyl group contains 6 to 12 carbons.

6. The method of claim 5 in which the surfactant is a sodium alkyldiphenyl ether disulfonate having an alkyl group of 8 to 15 carbons.

7. The method of claim 1 in which the mixture additionally includes a processing aid and a heat-stabilizing additive.

8. The method of claim 1 in which the composition is fabricated into a sheet having a thickness of about 5 to 15 mils.

9. The method of claim 1 in which the composition is fabricated into a tubulet having an outside diameter of about 0.03 to 0.08 inch and a wall thickness of about 0.005 to 0.020 inch.

References Cited

UNITED STATES PATENTS

| 2,700,694 | 1/1955 | Fernald | 260—2.5 M |
| 3,375,208 | 3/1968 | Duddy | 260—2.5 M |
| 3,654,065 | 4/1972 | Dorogi | 260—2.5 M |
| 3,509,078 | 4/1970 | Roubinek et al. | 260—2.5 M |
| 3,576,686 | 4/1971 | Schmidle et al. | 260—2.5 M |

WILBERT J. BRIGGS, SR., Primary Examiner

U.S. Cl. X.R.

210—500; 260—897 C, 2.5 HA, 899, 45.75 K; 264—49